United States Patent
Sasaki et al.

(10) Patent No.: US 12,018,120 B2
(45) Date of Patent: Jun. 25, 2024

(54) METHOD FOR PRODUCING TERMINAL CARBOXYL GROUP-CONTAINING POLYETHYLENE GLYCOL AND METHOD FOR PRODUCING ACTIVATED POLYETHYLENE GLYCOL

(71) Applicant: NOF CORPORATION, Tokyo (JP)

(72) Inventors: Shota Sasaki, Kawasaki (JP); Yuichi Takahashi, Kawasaki (JP); Atsushi Sato, Kagawa (JP); Tsuyoshi Takehana, Kawasaki (JP); Toshihiko Hagihara, Kawasaki (JP)

(73) Assignee: NOF CORPORATION, Tokyo (JP)

( * ) Notice: Subject to any disclaimer, the term of this patent is extended or adjusted under 35 U.S.C. 154(b) by 535 days.

(21) Appl. No.: 17/436,738

(22) PCT Filed: Mar. 25, 2020

(86) PCT No.: PCT/JP2020/013438
§ 371 (c)(1),
(2) Date: Sep. 7, 2021

(87) PCT Pub. No.: WO2020/203583
PCT Pub. Date: Oct. 8, 2020

(65) Prior Publication Data
US 2022/0185957 A1 Jun. 16, 2022

(30) Foreign Application Priority Data
Mar. 29, 2019 (JP) .................... 2019-066253

(51) Int. Cl.
*C08G 65/332* (2006.01)
(52) U.S. Cl.
CPC ................ *C08G 65/3322* (2013.01)
(58) Field of Classification Search
CPC ............. C08G 65/332; C08G 65/329; C08G 65/3322; C08G 65/33396; C08G 65/337; C08G 65/338; A61K 47/60
See application file for complete search history.

(56) References Cited

U.S. PATENT DOCUMENTS

| | | | |
|---|---|---|---|
| 5,605,976 A | 2/1997 | Martinez et al. | |
| 5,681,567 A * | 10/1997 | Martinez .............. | C08G 65/338 560/182 |
| 7,193,031 B2 | 3/2007 | Bailon et al. | |
| 10,011,682 B2 * | 7/2018 | Harris .................... | C08G 63/91 |
| 2005/0171291 A1 | 8/2005 | Kozlowski et al. | |
| 2013/0172576 A1 | 7/2013 | Kamiya et al. | |
| 2019/0055353 A1 | 2/2019 | Doi et al. | |
| 2020/0079903 A1 | 3/2020 | Yoshioka et al. | |

FOREIGN PATENT DOCUMENTS

| | | |
|---|---|---|
| EP | 0 213 800 A2 | 3/1987 |
| JP | 62-39537 A | 2/1987 |
| JP | 2005-538226 A | 12/2005 |
| JP | 2006-502250 A | 1/2006 |
| JP | 2007-538111 A | 12/2007 |
| JP | 2011-84632 A | 4/2011 |
| JP | 2013-75975 A | 4/2013 |
| JP | 2017-95565 A | 6/2017 |
| JP | 2018-172649 A | 11/2018 |
| WO | 00/12458 A1 | 3/2000 |
| WO | 2004/012773 A1 | 2/2004 |
| WO | 2004/022629 A2 | 3/2004 |
| WO | 2005/070973 A2 | 8/2005 |

OTHER PUBLICATIONS

Communication dated Aug. 3, 2023 by Japan Patent Office for Japanese Patent Application No. 2020-053731.
Schiavon et al., "PEG-Ara-C conjugates for controlled release", European Journal of Medicinal Chemistry, 2004, pp. 123-133, vol. 39.
Office Action dated Jan. 9, 2024, issued by Indian Patent Office in Indian Patent Application No. 202147041630.
Communication issued Dec. 2, 2022 by the European Patent Office for European Patent Application No. 20785409.2.
International Search Report (PCT/ISA/210) issued Jun. 23, 2020 by the International Searching Authority in counterpart International Patent Application No. PCT/JP2020/013438.
Written Opinion (PCT/ISA/237) issued Jun. 23, 2020 by the International Searching Authority in counterpart International Patent Application No. PCT/JP2020/013438.

* cited by examiner

*Primary Examiner* — Jafar F Parsa
*Assistant Examiner* — Blaine G Doletski
(74) *Attorney, Agent, or Firm* — Sughrue Mion, PLLC

(57) ABSTRACT

A method for producing a terminal carboxyl group-containing polyethylene glycol, which includes the following steps 1 and 2. Step 1: In a solution containing a polyethylene glycol having a hydroxyl group, an inorganic base 0.5 to 4 times the polyethylene glycol in mass, an aprotic solvent and water, mass of the water being 5 to 20 meq with respect to the inorganic base and mass of the water in the solution being 2,000 ppm or less, a compound of the formula (1) is reacted with the polyethylene glycol to obtain a polyethylene glycol ester:

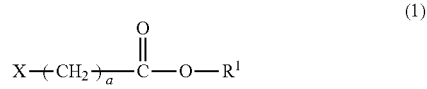

(1)

wherein X represents a leaving group, a represents an integer of 4 to 9, and $R^1$ represents a hydrocarbon group having 1 to 4 carbon atoms; Step 2: The polyethylene glycol ester is hydrolyzed to obtain a terminal carboxyl group-containing polyethylene glycol.

2 Claims, 1 Drawing Sheet

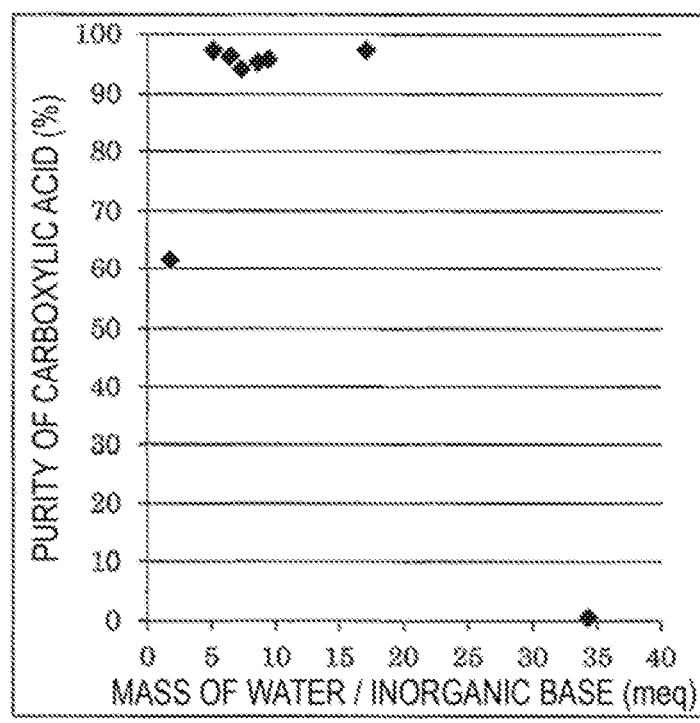

METHOD FOR PRODUCING TERMINAL CARBOXYL GROUP-CONTAINING POLYETHYLENE GLYCOL AND METHOD FOR PRODUCING ACTIVATED POLYETHYLENE GLYCOL

CROSS REFERENCE TO RELATED APPLICATIONS

This application is a National Stage of International Application No. PCT/JP2020/013438, filed Mar. 25, 2020, claiming priority based on Japanese Patent Application No. 2019-066253, filed Mar. 29, 2019, the disclosures of which are incorporated herein by reference in their entirety.

TECHNICAL FIELD

The present invention relates to a method for producing a terminal carboxyl group-containing polyethylene glycol and a method for producing an activated polyethylene glycol.

BACKGROUND ART

In recent years, development of biopharmaceuticals such as proteins and antibodies has been actively promoted. While these biopharmaceuticals have high efficacy as drugs from the viewpoint of their specificity and efficiency, they have poor pharmacokinetics such as excretion from kidney, capture by the reticuloendothelial system, and decomposition in blood, so that it becomes a problem that the in-vivo half life is short. This problem not only makes clinical application of the drugs difficult, but also causes a significant decrease in QOL of patients owing to an increase in the dose and frequency of the drugs thereto after the drugs are put on the market.

In order to solve the above problem, modification of a drug with a water-soluble polymer such as polyethylene glycol (hereinafter referred to as PEG) has been studied. By modifying the drug with a polymer such as PEG to impart a stealth property, the excretion from kidney and the decomposition in blood can be suppressed, and circulation of the drug in blood is improved, so that the in-vivo half life can be extended. Thus, a PEGylated biopharmaceutical to which these characteristics are applied has been developed and put on the market.

In order to modify a biopharmaceutical with PEG, it is necessary to convert a PEG terminal into a reactive functional group that selectively reacts with an amino group, a thiol group, or the like present in the biopharmaceutical. One of such functional group conversions is a method of converting a hydroxyl group at the PEG terminal into a carboxyl group and further converting it into a succinimidyl ester. The succinimidyl ester is one of the most widely used activating groups in protein modification because the ester reacts with a primary amine under physiological conditions to form a stable amide.

However, with regard to the conversion of the PEG-terminal hydroxyl group to a reactive functional group as described above, for example, the conversion into a carboxyl group, when the compound of the terminal hydroxyl group remains in the conversion of the terminal functional group from the hydroxyl group to the carboxyl group, in the reaction of introducing succinimidyl ester to the carboxylic acid terminal in the next step, the terminal hydroxyl group remains unreacted as a hydroxyl group. As a result, the remaining hydroxyl group reacts with the succinimidyl ester group, which causes production of a multimeric PEG impurity as a by-product.

Further, in a polymer compound such as PEG, since a terminal functional group has a small effect on the physical properties of the entire molecule, removal of the terminal hydroxyl group compound from the terminal carboxylic acid compound is generally difficult unless a purification process which is low in productivity, for example, column purification or the like is performed. Therefore, it is preferable that the conversion rate from the hydroxyl group to the carboxyl group is high.

The Williamson etherification reaction is known as a method for introducing a carboxyl group into a compound having a hydroxyl group at the terminal (hereinafter, compound X), and a method of reacting a compound having an ester group and a leaving group in the molecule (hereinafter, compound Y) and subsequently hydrolyzing the ester group has been applied.

The following Patent Literatures 1 and 2 show Synthetic Examples of the Williamson etherification reaction.

In Patent Literature 1, the etherification is performed where the compound X is stearyl alcohol and the compound Y is an allyl halide, using toluene that is an aprotic solvent as a solvent and NaOH or KOH as an inorganic base.

Further, in Patent Literature 2, an objective product is obtained in 48 yield by carrying out the reaction in a two-layer system consisting of toluene and an aqueous solution of sodium hydroxide in the presence of a phase transfer catalyst where the compound X is a phenylphenol derivative and the compound Y is a low-molecular-weight methoxy PEG having a terminal tosyl group to introduce the compound Y into the compound X and performing the purification using a silica gel column.

PRIOR ART DOCUMENTS

Patent Literature

Patent Literature 1: JP-A-62-39537
Patent Literature 2: JP-A-2011-84632

SUMMARY OF INVENTION

Problem to be Solved By Invention

In the Williamson etherification reaction as described in Patent Literature 1, when water is present in the reaction mixture, since an undesired side reaction such as a reaction of water with the compound occurs, water is removed from the reaction system by azeotropic dehydration, it is described that the water content in the system after the azeotropic distillation is preferably less than 0.05 wt % and the reaction does not proceed unless substantially all the water is distilled off.

With regard to the conditions of the Williamson etherification reaction, as described in Patent Literature 1, there is known a reaction using an inorganic base such as potassium hydroxide or potassium carbonate as a catalyst under such a condition that the water content is controlled to be extremely low in an aprotic solvent, e.g., toluene as a representative, in order to suppress unnecessary side reactions.

The unnecessary side reactions include, in the case of Patent Literature 1 as an example, a reaction where the allyl halide is hydrolyzed with water in the system to become allyl alcohol and a reaction where the allyl alcohol produced as a by-product is further etherified with the allyl halide.

However, in this generally performed reaction method, since the inorganic base is not dissolved in the aprotic solvent and the reaction is performed in a heterogeneous system, alcoholate formation is less likely to proceed, which is the rate-determining factor of the reaction.

As described in Patent Literature 2, there is performed an example where a large amount of a protonic solvent such as water is used to dissolve the inorganic base, but as mentioned above, undesired side reactions caused by water in the system occur frequently. Since the yield after silica gel column purification is 48%, it is considered that the purity of the objective etherified product obtained by the reaction is correspondingly low.

As described above, although the terminal carboxyl group-containing PEG is an important material in biopharmaceutical applications, the conventional production method of terminal carboxylation has many problems in obtaining a highly pure product industrially in good yields.

An object of the present invention is to produce a PEG having a high carboxyl group purity from PEG having a terminal hydroxyl group in good yields.

A further object of the present invention is to produce an activated PEG for biopharmaceutical applications with high purity by using the PEG having a high carboxyl group purity.

Means for Solving the Problem

As a result of intensive studies to achieve the above objects, the present inventors have found that, after dissolving a terminal hydroxyl group PEG in an aprotic solvent, with regard to the Williamson etherification reaction to be carried out conventionally with controlling the water content to be low (substantially anhydrous conditions), a PEG having, a significantly high etherification rate, i.e., carboxylic acid purity can be surprisingly obtained by carrying out the etherification reaction in the presence of a specific amount range of water with respect to the inorganic base.

Thus, the present invention is as follows.
(1) A method for producing a terminal carboxyl group-containing polyethylene glycol, which comprises the following steps 1 and 2:
Step 1:
a step of reacting a compound of the following formula (1), in a solution containing a polyethylene glycol having a hydroxyl group, an inorganic base 0.5 to 4 times the polyethylene glycol in mass, an aprotic solvent and water, mass of the water being 5 to 20 meq with respect to the inorganic base and mass of the water in the solution being 2,000 ppm or less, with the polyethylene glycol to obtain a polyethylene glycol ester:

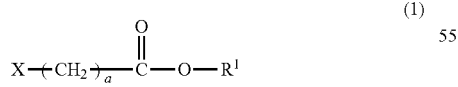

wherein, in the formula (1), X represents a leaving group, a represents an integer of 4 to 9, and $R^1$ represents a hydrocarbon group having 1 to 4 carbon atoms;
Step 2:
a step of hydrolyzing the polyethylene glycol ester to obtain a terminal carboxyl-containing polyethylene glycol.
(2) A method for producing an activated polyethylene glycol, which comprises the following steps 1, 2 and 3:
Step 1:
a step of reacting a compound of the following formula (1), in a solution containing a polyethylene glycol having a hydroxyl group, an inorganic base 0.5 to 4 times the polyethylene glycol in mass, an aprotic solvent and water, mass of the water being 5 to 20 meq with respect to the inorganic base and mass of the water in the solution being 2,000 ppm or less, with the polyethylene glycol to obtain a polyethylene glycol ester:

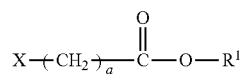

wherein, in the formula (1), X represents a leaving group, a represents an integer of 4 to 9, and $R^1$ represents a hydrocarbon group having 1 to 4 carbon atoms;
Step 2:
a step of hydrolyzing the polyethylene glycol ester to obtain a terminal carboxyl-containing polyethylene glycol;
Step 3:
a step of converting the terminal carboxyl group of the terminal carboxy group-containing polyethylene glycol into an activating group, thereby obtaining an activated polyethylene glycol having the activating group.

Effect of the Invention

The present invention is a production method for obtaining a terminal carboxyl group-containing PEG for biopharmaceutical applications and the like in good yields and with high purity. This production method does not need anhydrous conditions which are required in the conventional production method and can provide highly pure terminal carboxyl group-containing PEG and a highly pure activated PEG in good yields without performing purification unsuitable for industrial production, such as silica gel column purification.

BRIEF DESCRIPTION OF DRAWINGS

The FIGURE is a graph which shows the relationship between the mass of water in a solution of an aprotic solvent containing water with respect to an inorganic base, and the purity of carboxylic acid.

EMBODIMENTS FOR CARRYING OUT THE INVENTION

The polyethylene glycol having a hydroxyl group, which is a raw material of the terminal carboxyl group-containing polyethylene glycol obtained by the present invention, is preferably represented by the following formula (2) or (3).

In the formula (2), $R^2$ represents a methoxy group or a hydroxyl group, and n is 45 to 1819.

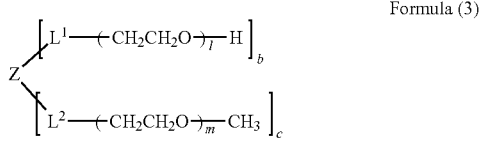

Formula (3)

In the formula (3), Z is a residue of a compound having 3 to 8 active hydrogens, $L^1$ and $L^2$ represent each either —O— or —O—CONH—$(CH_2)_3$—O—, and b and c are each an integer of 0 to 8 and b+c=3 to 8, l represents an integer of 0 or 6 to 606, and in represents an integer of 12 to 909.

In a preferable embodiment of the polyethylene glycol having a hydroxyl group of the formula (2), $R^2$ in the formula (2) is a methoxy group.

Further, in a preferable embodiment of the polyethylene glycol having a hydroxyl group of the formula (2), $R^2$ in the formula (2) is a hydroxyl group.

In the following formula (4), which is one of the preferable embodiments of the polyethylene glycol having a hydroxyl group of the formula (3), Z in the formula (3) is a glycerin residue, b is 3, c is 0, $L^1$ is —O—, and l is 15 to 606.

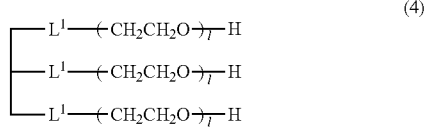

(4)

In the following formula (5), which is one of the preferable embodiments of the polyethylene glycol having a hydroxyl group of the formula (3), Z in the formula (3) is a glycerin residue, b is 1, c is 2, $L^1$ and $L^2$ are each —O—, l is 0, and m is 23 to 909. Alternatively, b is 1, c is 2, $L^1$ is —O—CONH—$(CH_2)_3$—O—, $L^2$ is —O—, l is 45 to 272, and m is 23 to 773.

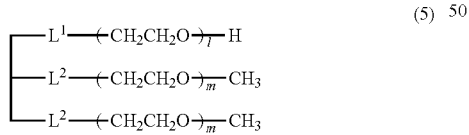

(5)

Further, in a preferable embodiment of the polyethylene glycol having a hydroxyl group of the formula (3), Z of the formula (3) is a pentaerythritol residue, b is 4, c is 0, $L^1$ is —O—, and l is 12 to 454.

Moreover, in the following formula (6), which is one of the preferable embodiments of the polyethylene glycol having a hydroxyl group of the formula (3), Z in the formula (3) is a xylitol residue, b is 1, c is 4, $L_1$ and $L_2$ are each —O—, l is 0, and m is 12 to 454.

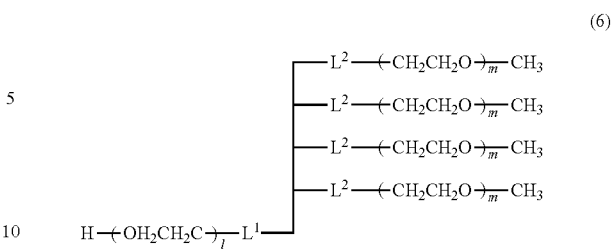

(6)

Further, in a preferable embodiment of the polyethylene glycol having a hydroxyl group of the formula (3), Z in the formula (3) is a hexaglycerol residue, b is 8, c is 0, $L^1$ is —O—, and l is 6 to 227.

Moreover, in a preferable embodiment of polyethylene glycol having a hydroxyl group of the formula (3), Z in the formula (3) is a residue of the compound represented by the formula (7), b is 8, c is 0, $L^1$ is —O—, and l is 6 to 227.

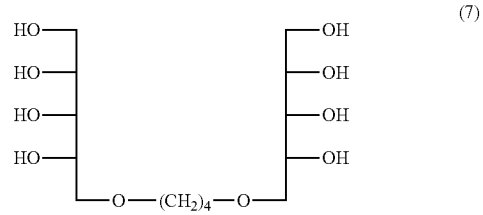

(7)

The residue of the compound having 3 to 8 active hydrogens, which is Z in the formula (3), means a residue of each of glycerin, pentaerythritol, xylitol, polyglycerin, and the compound represented by the formula (7), the hydroxyl group that contributed to the binding reaction with the polpoxyethylene chain therein being removed.

Compound of Formula (1)

The compound of the present invention, which is used for reacting with the polyethylene glycol having a hydroxyl group to obtain a polyethylene glycol ester having a terminal carboxylic acid, is represented by the formula (1).

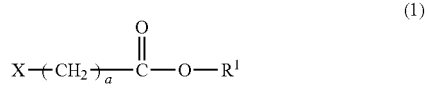

(1)

X contained in the structure of the compound of the formula (1) represents a leaving group, —$(CH_2)_a$- represents a hydrocarbon group, and $R^1$ represents a hydrocarbon group at the terminal of the ester group.

The leaving group: X contained in the structure of the compound of the formula (1) is a functional group having a property of being eliminated during the esterification reaction, but is preferably an iodine atom, a bromine atom, a chlorine atom, a methanesulfonyloxy group, a p-toluenesulfonyloxy group, or a trifluoromethanesulfonyloxy group. As the leaving group, an iodine atom, a bromine atom, and a chlorine atom are particularly preferable.

a of the hydrocarbon group: —$(CH_2)_a$- contained in the structure of the compound of the formula (1) represents the number of methylene chains, and a is 4 to 9, preferably 4 to 6.

$R^1$ contained in the structure of the compound of the formula (1) is a hydrocarbon group at the terminal of the ester group. The hydrocarbon group constituting $R^1$ preferably has 1 to 4 carbon atoms, and more preferably 1 to 2 carbon atoms. Specific examples of $R^1$ are preferably a methyl group, an ethyl group, a propyl group, an isopropyl group, a butyl group, an isobutyl group, a sec-butyl group, and a tert-butyl group, particularly preferably a methyl group and an ethyl group, and more preferably, an ethyl group.

The terminal carboxyl group-containing polyethylene glycol obtained by the present invention is preferably represented by the following formula (8) or (9).

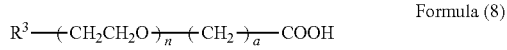

Formula (8)

In the formula (8), $R^3$ is a methoxy group or —O—$(CH_2)$a-COOH, and a and n have the same meanings as described above.

In a preferable embodiment of the terminal carboxyl group-containing polyethylene glycol of the formula (8), $R^3$ in the formula is a methoxy group and a is 5.

Further, in a preferable embodiment of the terminal carboxyl group-containing polyethylene glycol of the formula (8), $R^3$ in the formula is —O—$(CH_2)$a-COOH and a is 5.

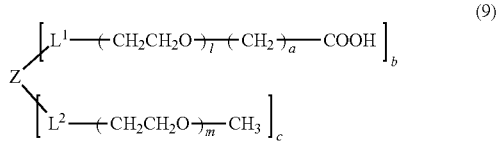

(9)

In the formula (9), a, b, l, m, $L^1$, $L^2$, and Z have the same meanings as described above.

In a preferable embodiment of the terminal carboxyl group-containing polyethylene glycol of the formula (9), Z in the formula is a glycerin residue, a is 5, b is 3, c is 0, $L^1$ is —O—, and l is 15 to 606.

Further, in a preferable embodiment of the terminal carboxyl group-containing polyethylene glycol of the formula (9). Z the formula is a glycerin residue, a is 5, b is 1, c is 2, l is 0, $L^1$ and $L^2$ are each —O—, and m is 23 to 909.

Moreover, in a preferable embodiment of the terminal carboxyl group-containing polyethylene glycol of the formula (9), Z in the formula is a glycerin residue, a is 5, b is 1, c is 2, $L^1$ is —O—CONH—$(CH_2)_3$—O—, $L^2$ is —O—, l is 45 to 272, and m is 23 to 773.

Further, in a preferable embodiment of the terminal carboxyl group-containing polyethylene glycol of the formula (9), Z in the formula is a pentaerythritol residue, a is 5, b is 4, c is 0, is —O—, and l is 12 to 454.

Furthermore, in a preferable embodiment of the terminal carboxyl group-containing polyethylene glycol of the formula (9), Z in the formula is a xylitol residue a is 5, b is 1, c is 4, $L^1$ and $L^2$ are each —O—, l is 0, and m is 12 to 454.

Moreover, in a preferable embodiment of the terminal carboxyl group-containing polyethylene glycol of the formula (9), Z in the formula is a hexaglycerol residue, a is 5, b is 8, c is 0, $L^1$ is —O—, and l is 6 to 227.

Further, in a preferable embodiment of the terminal carboxyl croup-containing polyethylene glycol of the formula (9), Z in the formula is a residue of the compound represented by the formula (7), a is 5, b is 8, c is 0, $L^1$ is —O—, and l is 6 to 227.

The total average molar number of ethylene oxide units added in the molecule of the terminal carboxyl group-containing polyethylene glycol obtained by the present invention is preferably 45 or more, more preferably 113 or more, and even more preferably 450 or more. Further, the total average molar number of ethylene oxide units added in the molecule of the polyethylene glycol having a carboxyl group at the terminal of the present invention is preferably 1,819 or less, and more preferably 1,023 or less.

The weight average molecular weight of the terminal carboxyl group-containing polyethylene glycol obtained by the present invention is preferably 2,000 or more, more preferably 5,000 or more, and even more preferably 20,000 or more. Further, the weight average molecular weight of the polyethylene glycol having a carboxyl group at the terminal of the present invention is 80,000 or less, and more preferably 45,000 or less.

The terminal carboxyl group-containing polyethylene glycol obtained by the present invention has a linear or branched structure. The branched type is a glycerin backbone, a lysine backbone, a pentaerythritol backbone, a xylitol backbone, a poly glycerin backbone, or a backbone of the compound represented by the formula (4), and more preferably a glycerin backbone or a pentaerythritol backbone.

The linear terminal carboxyl group-containing polyethylene glycol obtained by the present invention has one or two carboxyl groups in the structure, and the branched type has one, two, three, four, or eight carboxyl groups.

(Step 1)

This is a step of reacting a compound of the following formula (1), in a solution containing a polyethylene glycol having a hydroxyl group, an inorganic base 0.5 to 4 times the polyethylene glycol in mass, an aprotic solvent and water, mass of the water being 5 to 20 meg with respect to the inorganic base and mass of the water in the solution being 2,000 ppm or less, with the polyethylene glycol to obtain a polyethylene glycol ester.

As the inorganic base to be used in (Step 1), there may be mentioned sodium hydroxide, potassium hydroxide, sodium hydride, t-butoxypotassium, and the like, and sodium hydroxide and potassium hydroxide are preferred. Further, the inorganic bases may also be used in combination.

The mass of the inorganic base to be used in (Step 1) is 0.5 to 4 times the mass of the polyethylene glycol having a hydroxyl group in mass. When it is less than 0.5 times in mass, the alcoholate formation of the polyethylene glycol having a hydroxyl group does not proceed sufficiently and the purity of carboxylic acid may decrease. Therefore, the amount is controlled to be 0.5 times in mass or more, but 1 time in mass or more is more preferable. Further, when the amount is more than 4 times in mass, the basicity becomes too strong in the etherification step, the leaving group in the compound represented by the formula (1) may be decomposed before the reaction, and further, since the amount of an acid to be used in the neutralization operation performed after etherification and hydrolysis increases and the pot efficiency may be lowered, the amount is controlled to be 4 times in mass or less, but 3 times in mass or less is more preferable.

The solvent to be used in (Step 1) is not particularly limited as long as it is an aprotic solvent, but from the viewpoint that polyethylene glycol dissolves within the reaction temperature range in the present invention and does not affect the reaction, hydrocarbon-based solvents such as toluene, xylene, and methyl-tert-butyl ether are preferably used. Further, plurality of these aprotic solvents may be used in combination.

The aprotic solvent to be used in (Step 1) is a solvent having no proton-donating functional group. The amount of the aprotic solvent is not particularly limited, but in the present reaction, only the polyethylene glycol having a hydroxyl group and the compound represented by the formula (1), which are main raw materials, are dissolved in the aprotic solvent, and the inorganic base is not dissolved, so that the reaction is performed in a heterogeneous system. Therefore, in order to promote the etherification rate, conditions under which the inorganic base sufficiently flows are required. When the amount of the aprotic solvent is small, sufficient flowability cannot be obtained, the alcoholate formation of the polyethylene glycol, which is the rate-determining step of the reaction, does not proceed, and the etherification rate becomes low, so that the purity of carboxylic acid may also decrease.

On the other hand, when the amount of the solvent is large, not only the concentration of the polyethylene glycol having a hydroxyl group and the compound represented by the formula (1) decreases and hence the etherification reaction rate decreases, but also the leaving group: X of the compound represented by the formula (1) is decomposed and does not contribute to the reaction as the reaction takes a longer period of time, so that a decrease in the etherification rate may occur.

From the above viewpoint, the amount (mass) of the aprotic solvent to be used is preferably 5 times or more and 30 times or less, more preferably 10 times or more and 20 times or less the mass of the polyethylene glycol having a hydroxyl group as a raw material.

The amount of the compound represented by the formula (1) to be used in (Step 1) is preferably 5 to 80 molar equivalents, more preferably 10 to 30 molar equivalents, with respect to one hydroxyl group of the polyethylene glycol having a hydroxyl group as a raw material.

It is necessary to control the mass of water in the solution in (Step 1) to such an amount that water is soluble in the aprotic solvent without separation. By dissolving the water in an aprotic solvent, the inorganic base is supplied into the system via dissolution thereof in the water in the aprotic solvent, and it becomes possible to promote the alcoholate formation and etherification reaction of the PEG terminal dissolved in the aprotic solvent.

When the mass of water in the solution is less than 5 meq with respect to the inorganic base, the amount of water that mediates the supply of the inorganic base to the aprotic solvent decreases, so that the alcoholate formation reaction is less likely to proceed and the purity of carboxylic acid rimy be lowered. Therefore, the mass of water in the solution of the aprotic solvent is controlled to 5 meq or more, and more preferably 6 meq or more.

When the mass of water in the solution is more than 20 meq with respect to the inorganic base, the aprotic solvent and water separate, and the amount of the inorganic base supplied to the aprotic solvent is reduced, so that alcoholate formation and etherification are hindered. Therefore, the mass of water in the solution is controlled to 20 meq or less, and more preferably 18 meq or less.

Furthermore, as the mass of the water in the solution becomes larger than 2,000 ppm, the deliquescent of the surface of the inorganic base progresses, so that it adheres to the reaction vessel, the flowability of the reaction system is lost, and alcoholate formation and etherification may be less likely to proceed. From this point of view, the mass of the water in the solution is controlled to 2,000 ppm or less, but 1,500 ppm or less is more preferable. Further, the lower limit of the mass of the water in the solution is not limited, but is preferably 100 ppm or more, and more preferably 200 ppm or more.

In the production method of the present invention, by allowing water to exist in the system in the etherification reaction which is conventionally a water-prohibition reaction, carboxyl group-containing PEG having a high carboxyl group purity can be obtained in good yields.

The reaction temperature in (step 1) is not particularly limited: as long as it is a temperature at which the polyethylene glycol having a hydroxyl group as a raw material dissolves in the aprotic solvent. But, when the reaction temperature is low, the objective etherification reaction of the polyethylene glycol with the compound represented by the formula (1) (hereinafter referred to as reaction A) slows down, and the etherification reaction of the water in the stem with the compound represented by the formula (1) (hereinafter referred to as reaction B), which is a side reaction that occurs in concert with the main reaction, may proceed, so that the objective reaction A may be hindered. On the other hand, when the reaction temperature is high, the reaction B, which is a side reaction, occurs faster than the aforementioned objective reaction A, which may similarly hinder the progress of the reaction A. From the above viewpoint, preferable reaction temperature is 30° C. to 80° C., and more preferably 30° C. to 50° C.

(Step 2)

This is a step of hydrolyzing the polyethylene glycol ester obtained in Step 1 to obtain a terminal carboxyl-containing polyethylene glycol.

The hydrolysis of the polyethylene glycol ester in (Step 2) is carried out by adding water to the reaction solution after esterification in (Step 1) and heating. The amount of water to be used in (Step 2) is not particularly limited, but when it is small, the concentration of the system becomes high and a sufficient stirring performance is obtained, so that the hydrolysis reaction becomes insufficient and the esterified product remains and hence, the carboxylation rate may be lowered. When the amount of water is large, the basicity in the system is lowered and thus the basic hydrolysis reaction is less likely to proceed, so that the esterified product may remain and thus the carboxylation rate may decrease. From the above, the amount of water to be used in (Step 2) is preferably 1 to 20 times the polyethylene glycol having a hydroxyl group in mass.

The hydrolysis temperature in (Step 2) is not particularly limited as long as the hydrolysis proceeds sufficiently, but is preferably 40 to 100° C.

After the terminal carboxyl group-containing PEG is obtained by hydrolysis in (Step 2), the terminal carboxyl group-containing PEG is recovered by a step including any of extraction to an organic layer, concentration, adsorption treatment, crystallization, and drying.

(Step 3)

This is a method for producing an activated polyethylene glycol wherein the activated polyethylene glycol is produced by converting the terminal carboxyl group of the terminal carboxyl group-containing polyethylene glycol obtained in (Step 1) and (Step 2) into an activating group.

The definition of the activated polyethylene glycol is described.

The activated polyethylene glycol in the present invention is one in which the terminal carboxyl group of the polyethylene glycol is chemically converted so as to be able to react with an active group such as a hydroxyl group, a thiol group, or an amino group existing in a target biopharmaceutical.

As the activating group converted from the terminal carboxyl group in (Step 3), there may be mentioned a succinimidyl ester group, an acid halide group, a diazoacetyl group, are acrylimidazole group, and the like, and preferred is a succinimidyl ester group.

The method for converting the terminal carboxyl group into an activating group in (Step 3) is not particularly limited, but a method of dehydrating and condensing two molecules of the terminal carboxyl group-containing PEG under acidic conditions to form an acid anhydride and introducing an activating group, a method of introducing, an activating group after conversion to an active ester using a condensing agent, and the like may be mentioned, and preferred is the method of using a condensing agent.

The condensing agent to be used for the conversion to the activating group in (Step 3) includes a carbodiimide-based condensing agent, an imidazole-based condensing agent, a triazine-based condensing agent, a phosphonium-based condensing agent, an uronium-based condensing agent, a halouronium-based condensing agent, and the like. These can be used without particular limitation.

After the conversion reaction into the terminal carboxyl group in (Step 3), the activated polyethylene glycol is recovered by a step including any of extraction to an organic layer, concentration, adsorption treatment, crystallization, drying, and the like.

The terminal carboxyl group-containing polyethylene glycol of the present invention is a compound in which a carboxyl group is bonded to the terminal of a polyethylene glycol via an alkylene group having 4 to 9 carbon atoms, and is used for modification of low-molecular-weight drugs, proteins, and the like.

EXAMPLES

Hereinafter, the present invention will be described in further detail with reference to Examples.

The purity of the terminal carboxyl group-containing polyethylene glycol was measured using the following devices and reagents.
LC device: alliance (Waters)
Column: anion exchange column ES-502N (Asahipak), ϕ7.5 mm×100 mm
Flow rate: 1.0 mL/min
Column temperature: 30° C.
Detector: RI
Mobile phase: ammonium formate buffer

Example 1

After 101 g of a linear PEG (product from NOF, MEH-50H) having a molecular weight of 5,000, a hydroxyl group at one terminal, and a methoxy group at the other terminal and 1,800 g of toluene were charged into a 5 L four-necked flask, the temperature was raised under a nitrogen atmosphere and the whole was dissolved at 45° C. The water content in the system was adjusted, and it was confirmed to be 318 ppm (amount of water with respect to KOH: 9.42 meq). After adding 200 g of KOH (product from Toa Kogyo, flakes) to the solution, 89.2 g of ethyl 6-bromohexanoate (product from Tokyo Chemical Industry Co., Ltd.) was added dropwise at a solution temperature of 40° C. After completion of dropwise addition, the mixture was aged at 40° C. for 1.5 hours. After completion of aging, 700 g of water was charged, the temperature was raised to 70° C., and the mixture was stirred for 1 hour for hydrolysis. After hydrolysis, layer separation was performed under acidic conditions of hydrochloric acid and subsequently, a terminal carboxylic acid PEG was recovered from the aqueous layer using an organic solvent. After the solvent is distilled off, low-molecular-weight impurities were removed through purification by crystallization to obtain crystals.

The purity of the obtained terminal carboxyl group-containing polyethylene glycol was 95.8%, and the yield was 85.8 g (yield rate: 85.8%).

Example 2

After 41 g of a linear polyethylene glycol (product from NOF, MEH-20T) having a molecular weight of 20,000, a hydroxyl group at one terminal, and a methoxy group at, the other terminal and 323 g of toluene were charged into a 1 L four-necked flask and the whole was refluxed at 110±5° C. for 1 h under a nitrogen atmosphere, the water content in the system was adjusted to be 298 ppm (amount of water with respect to KOH: 5.11 meq), To the solution after the water content adjustment, 82 g of KOH was charged and 9.15 g of ethyl 6-bromohexanoate was added dropwise at 40° C. using a dropping funnel. After completion of dropwise addition, the mixture was aged at 40° C. for 4 hours. After completion of aging, 287 g of water was charged, the temperature was raised to 70° C., and hydrolysis was performed for 1 hour, Thereafter, a terminal carboxylic acid-containing polyethylene glycol was obtained by the same operations as in Example 1.

The purity of the obtained terminal carboxyl group-containing polyethylene glycol was 97.3%, and the yield was 36.1 g (yield rate: 88.0).

Example 3

After 41 g of a linear polyethylene glycol (product from NOF, MEH-20T) having a molecular weight of 20,000, a hydroxyl group at one terminal, and a methoxy group at the other terminal and 323 g of toluene were charged into a 1 L four-necked flask and the whole was refluxed at 110±5° C. for 1 h under a nitrogen atmosphere, the water content in the system was adjusted to be 513 ppm (amount of water with respect to KOH: 8.57 meq). To the solution after the water content adjustment, 82 g of KOH was charged and 9.15 g of ethyl 6-bromohexanoate was added dropwise at 40° C. using a dropping funnel. After completion of dropwise addition, the mixture was aged at 40° C. for 4 hours. After completion of aging, 287 g of water was charged, the temperature was raised to 70° C., and hydrolysis was performed for 1 hour. Thereafter, a terminal carboxylic acid-containing polyethylene glycol was obtained by the same operations as in Example 1.

The purity of the obtained terminal carboxyl group-containing polyethylene glycol was 95.3%, and the yield was 35.3 g (yield rate: 86.2%).

Comparative Example 1

After 41 g of a linear polyethylene glycol (product from NOF, MEH-20T) having a molecular weight of 20,000, a hydroxyl group at one terminal, and a methoxy group at the other terminal and 323 g of toluene were charged into a 1 L four-necked flask and the whole was refluxed at 110±5° C. for 1 h under a nitrogen atmosphere, the water content in the system was measured and found to be 102 ppm (amount of water with respect to KOH; 1.75 meq). To the solution, 82 g of KOH was charged and 9.15 g of ethyl 6-bromohexanoate was added dropwise at 40° C. using a dropping funnel, After completion of dropwise addition, the mixture was aged at 40° C. for 4 hours. After completion of aging, 287 g of water was charged, the temperature was raised to 70° C., and hydrolysis was performed for 1 hour. Thereafter, a terminal carboxylic acid-containing polyethylene glycol was obtained by the same operations as in Example 1.

The purity of the obtained terminal carboxyl group-containing polyethylene glycol was 61.7%, and the yield was 34.7 g (yield rate: 84.8%).

Hereinafter, similarly, polyethylene glycols having a hydroxyl group are described as shown in Table 1, and Examples 4 to 6 and Comparative Examples 2 and 3 were performed under the conditions shown in Table 1. The results are shown in Table 2.

TABLE 1

| | Polyethylene glycol having hydroxyl group | | | Mass of water | | Amount of raw materials used | |
| | Backbone | Molecular weight | Number of hydroxyl group | Charged amount | In reaction system (ppm) | Equivalent to inorganic base | Toluene | Inorganic base |
|---|---|---|---|---|---|---|---|---|
| Example 4 | linear | 20,000 | 1 | 41 g | 1153 | 17.1 meq | 323 g | KOH/82 g |
| Example 5 | linear | 40,000 | 2 | 40 g | 424 | 7.25 meq | 400 g | KOH/80 g |
| Example 6 | 4-branched | 20,000 | 4 | 150 g | 260 | 6.41 meq | 2250 g | KOH/300 g |
| Comparative Example 2 | linear | 20,000 | 1 | 41 g | 2000 | 34.3 meq | 323 g | KOH/82 g |
| Comparative Example 3 | linear | 20,000 | 1 | 41 g | 6000 | 102.9 meq | 323 g | KOH/82 g |

TABLE 2

| | Results | | |
|---|---|---|---|
| | Yield | Yield rate*1 | Purity of carboxylic acid |
| Example 4 | 36.4 g | 88.7% | 97.4% |
| Example 5 | 36.5 g | 91.3% | 94.3% |
| Example 6 | 115.8 g | 75.8% | 96.3% |
| Comparative Example 2 | 30.1 g | 73.4% | 0.67% |
| Comparative Example 3*2 | — | — | — |

*1A value with respect to the charged amount of the polyethylene glycol having hydroxyl group charged
*2In Comparative Example 3, KOH stuck to the flask wall surface due to the large mass of water in the system, and flowability was not obtained at all, so that the operation was stopped.

Example 7

Using 40 g of the terminal carboxyl group-containing polyethylene glycol obtained in Example 1, it was dissolved in 120 g of toluene at 40° C. Conversion into an activating group was achieved by carrying out a reaction at 40° C. for 3 hours using 2.03 g of N-hydroxysuccinimide and 3.30 g of dicyclohexylcarbodiimide. Low-molecular-weight impurities were removed through purification by crystallization to obtain 35 g of an activated polyethylene glycol.

The purity of the obtained activated polyethylene glycol was measured by $^1$H-NMR (600 MHz, CDCl$_3$) and found to be 95.8%.

Example 8

Using 25 g of the terminal carboxyl group-containing polyethylene glycol obtained in Example 5, it was dissolved in 75 g of toluene at 45° C. Conversion into an activating group was achieved by carrying out a reaction at 40° C. for 3 hours using 0.3 g of N-hydroxysuccinimide and 0.5 g of dicyclohexylcarbodiimide. Low-molecular-weight impurities were removed through purification by crystallization to obtain 35 g of an activated polyethylene glycol.

The purity of the obtained activated polyethylene glycol was measured by $^1$H-NMR (600 MHz CDCl$_3$) and found to be 94.3%.

Example 9

Using 30 g of the terminal carboxyl group-containing polyethylene glycol obtained in Example 6, it was dissolved in 90 g of toluene at 40° C. Conversion into an activating group was achieved by carrying out a reaction at 40° C. for 2 hours using 1.38 g of N-hydroxysuccinimide and 2.48 g of dicyclohexylcarbodiimide. Low-molecular-weight impurities were removed through purification by crystallization to obtain 25.6 g of an activated polyethylene glycol.

The purity of the obtained activated polyethylene glycol was measured by $^1$H-NMR (600 MHz, CDCl$_3$) and found to be 96.3%.

Table 3 shows the results of producing activated polyethylene glycols using the terminal carboxyl group-containing polyethylene glycols produced in Examples 1, 5, and 6.

TABLE 3

| | Terminal carboxyl group-containing polyethylene glycol | | Purity of activated polyethylene glycol |
|---|---|---|---|
| | Raw material used | Purity | |
| Example 7 | Product in Example 1 | 95.8% | 95.8% |
| Example 8 | Product in Example 5 | 94.3% | 94.3% |
| Example 9 | Product in Example 6 | 96.3% | 96.3% |

As shown in Examples 1 to 3 and Table 2, the purity of carboxylic acid of the terminal carboxyl group-containing polyethylene glycol obtained by the method of the present invention was significantly high as compared with the case of Comparative Example 1 where water content was controlled to be low, Which is a common case, and the case of Comparative Example 2 where the reaction was carried out while controlling the water content more than the preferable range.

As shown in Table 3, a highly pure activated PEG can be obtained by using the terminal carboxyl group-containing PEG obtained by the method of the present invention.

From the above, according to the present invention, a terminal carboxyl group-containing polyethylene glycol can be industrially produced with high purity and in good yields. Further, the present invention is a useful method capable of obtaining a highly pure terminal-activated PEG by using the pure terminal carboxy group-containing PEG obtained by the present invention.

INDUSTRIAL APPLICABILITY

According to the present invention, it is possible to provide a production method for obtaining a terminal carboxyl group-containing PEG for biopharmaceutical applications and the like in good yields and with high purity.

Although the present invention has been described in detail with reference to specific embodiments, it will be apparent to those skilled in the art that various changes and modifications can be made without departing from the spirit and scope of the present invention.

The invention claimed is:

1. A method for producing a terminal carboxyl group-containing polyethylene glycol, which comprises the following steps 1 and 2:
   Step 1:
      a step of reacting a compound of the following formula (1), in a solution containing a polyethylene glycol having a hydroxyl group, an inorganic base 0.5 to 4 times the polyethylene glycol in mass, an aprotic solvent and water, mass of the water being 5 to 20 meq with respect to the inorganic base and mass of the water in the solution being 2,000 ppm or less, with the polyethylene glycol to obtain a polyethylene glycol ester:

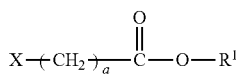

(1)

wherein, in the formula (1), X represents a leaving group, a represents an integer of 4 to 9, and $R^1$ represents a hydrocarbon group having 1 to 4 carbon atoms;
   Step 2:
      a step of hydrolyzing the polyethylene glycol ester to obtain a terminal carboxyl group-containing polyethylene glycol.

2. A method for producing an activated polyethylene glycol, which comprises the following steps 1, 2 and 3:
   Step 1:
      a step of reacting a compound of the following formula (1), in a solution containing a polyethylene glycol having a hydroxyl group, an inorganic base 0.5 to 4 times the polyethylene glycol in mass, an aprotic solvent and water, mass of the water being 5 to 20 meq with respect to the inorganic base and mass of the water in the solution being 2,000 ppm or less, with the polyethylene glycol to obtain a polyethylene glycol ester:

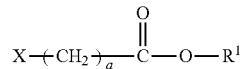

(1)

wherein, in the formula (1), X represents a leaving group, a represents an integer of 4 to 9, and $R^1$ represents a hydrocarbon group having 1 to 4 carbon atoms;
   Step 2:
      a step of hydrolyzing the polyethylene glycol ester to obtain a terminal carboxyl group-containing polyethylene glycol;
   Step 3:
      a step of converting the terminal carboxyl group of the terminal carboxyl group-containing polyethylene glycol into an activating group, thereby obtaining an activated polyethylene glycol having the activating group.

* * * * *